United States Patent [19]
Bowen et al.

[11] Patent Number: 6,120,860
[45] Date of Patent: Sep. 19, 2000

[54] MULTILAYER FILM STRUCTURE AND PACKAGES THEREFROM FOR ORGANICS

[75] Inventors: William E. Bowen, Neenah; Lee J. Murray, Jr., Appleton, both of Wis.

[73] Assignee: American National Can Company, Chicago, Ill.

[21] Appl. No.: 08/756,190

[22] Filed: Nov. 25, 1996

Related U.S. Application Data

[63] Continuation-in-part of application No. 08/372,210, Jan. 13, 1995, abandoned, which is a continuation of application No. 07/908,422, Jun. 30, 1992, abandoned, which is a continuation-in-part of application No. 07/571,856, Aug. 23, 1990, abandoned.

[51] Int. Cl.$^7$ ........................................................ B29B 1/08
[52] U.S. Cl. ...................... 428/34.2; 428/34.3; 428/35.2; 428/35.3; 428/35.4; 383/211
[58] Field of Search .................................. 428/34.2, 34.3, 428/35.2, 35.3, 35.4, 461, 458, 475.8, 522; 383/211

[56] References Cited

U.S. PATENT DOCUMENTS

| | | | |
|---|---|---|---|
| 4,085,244 | 4/1978 | Stillman | 428/192 |
| 4,284,672 | 8/1981 | Stillman | 428/35.3 |
| 4,284,674 | 8/1981 | Sheptak | 428/69 |
| 4,405,667 | 9/1983 | Christensen et al. | 428/35.4 |
| 4,795,665 | 1/1989 | Lancaster et al. | 428/34.2 |

*Primary Examiner*—S. Mark Clardy
*Assistant Examiner*—Michael A. Williamson
*Attorney, Agent, or Firm*—McDermott, Will & Emery

[57] ABSTRACT

Multilayer film structures and packages therefrom which are particularly suited for containing organics such as organic liquids or solvents, e.g., amines, diamines, triamines, xylenes, tolene, ethoxyethanols, urethanes, or epoxies, or the like, or materials containing organics are disclosed as are methods for containing such organics. The film structures have two layer elements. The first layer element has a flexible barrier material layer and a sealant layer; the second layer element has a high barrier material layer; and when formed into a package such as a pouch the sealant layer is disposed interiorly and is used to seal the package together. Suitable materials for the high barrier material include metal foil, e.g., aluminum foil, and nylon coated on at least one side with a polyvinylidene chloride copolymer; the flexible barrier material layer is suitably nylon; and, the sealant is preferably ethylene vinyl acetate. Additional layers such as additional primer, adhesive, tie or sealant layers can also be present as can at least one protective layer disposed over the high barrier material layer. The packages of this invention can contain the organics in varying conditions, including elevated heat and/or humidity, without blistering, bubbling, cracking or product permeation.

25 Claims, No Drawings

MULTILAYER FILM STRUCTURE AND PACKAGES THEREFROM FOR ORGANICS

This application is a continuation-in-part of continuation application, Ser. No. 08/372,210, filed Jan. 13, 1995, abandoned which is a continuation, of application Ser. No. 07/908,422 filed Jun. 30, 1992, abandoned which is a continuation, of application Ser. No. 07/571,856 filed Aug. 23, 1990, abandoned.

This invention relates to multilayer film structures and packages such as pouches therefrom which are particularly suited for containing organics such as organic liquids or organic solvents, e.g., products containing amines, diamines, triamines, xylenes, toluene, ethoxyethanols, urethanes, or epoxies, or the like.

BACKGROUND OF THE INVENTION

As background, reference is made to the following U.S. Patents which generally relate to packaging materials including those for holding products of unstable or chemically reactive nature, but which fail to teach or suggest the present invention:

| U.S. Pat. No. | Patentee | Issue Date |
| --- | --- | --- |
| 4,085,244 | Stillman | April 18, 1978 |
| 4,105,118 | Williams, Jr., et al | August 8, 1978 |
| 4,216,268 | Stillman | August 5, 1980 |
| 4,241,130 | Barnes | December 23, 1980 |
| 4,257,536 | Hilmar | March 24, 1981 |
| 4,284,672 | Stillman | August 18, 1981 |
| 4,322,003 | Long | March 30, 1982 |
| 4,698,247 | Murray et al | October 6, 1987 |
| 4,731,268 | Murray, Jr. et al | March 15, 1988 |

In particular, none of the above-referenced documents, either individually or in any combination teaches or suggests a packaging film structure or package therefrom comprising: a first layer element comprised of a flexible barrier material and a sealant film, and a second layer element comprised of a high barrier material wherein the second layer element is positioned outwardly of the first layer element and the sealant is positioned inwardly of the flexible barrier, i.e.: (outside) second layer element/flexible barrier/sealant (inside).

Reference is also made to the commonly owned and copending application of Blemberg et al, U.S. application Ser. No. 07/458, 484, filed Dec. 28, 1989, and incorporated herein by reference. Blemberg et al relates to blended films, structures therefrom and methods of making and using them, e.g., multilayer structures wherein the layers have improved adhesion to each other. Such blended films can be usefully employed as layers in the structures of the present invention.

The packaging of organics especially organic liquids, e.g., polymer adhesive and coating systems, particularly two part systems, pose extroadinary problems for flexible packaging structures. In many cases, the organic adhesive or coating formulations contain aggressive solvents such as xylene or toluene. A particularly hard to hold series of products were found to be hardeners for two part curing systems (epoxy and urethanes). For example, products such as Stonhard, Inc. Product 128A containing xylenes, 2-ethoxyethanol and diethylene triamine and Product 120A containing diethylene triamine and m-phyenylenediamine were used in tests and were found to present problems when packaged in pouches and subjected to various storage conditions such as high humidity and/or varying temperature.

When high humidity is present moisture can penetrate some package structures and combine with the amines in the product packaged therein. In some structures, when humidity is present, moisture travels inward and the amine travels outward driven by the concentrations or chemical potential differences. In several cases, a solution is formed inside or between the layers of the structure which creates osmotic pressures causing bubbles or blisters to appear in an intermediate layer.

In adhesive laminated pouch structures, the organics, e.g., solvents, penetrate the sealant layer and attack the adhesive. This causes the structure to delaminate, thus losing the benefit of barrier and other properties built into the lamination. Tests have shown that high performance primers and extrusion lamination offer a superior means of constructing a lamination; but, by themselves still fall short of the requirements of a package for organics. Coextrusion of several layers offers a means to obtain very high bonding of layers such as in a multilayer cast or blown film; but, when metal, foil or biaxially oriented film must be used in a structure, one must generally rely on extrusion lamination and in previous structures the packages have still failed to meet the requirements for packaging organics.

Such materials as aluminum foil, oriented polyester and Barex$^R$ in some standard flexible packaging configurations were shown to offer a barrier to the organic product; but, all were prone to stress cracking, thus allowing the organic product to permeate. In high humidity storage and when amine-containing products were used, the area around the stress cracks quickly developed blisters of water and product. This was seen, for example, in a structure of polyethylene terephthalate (PET)/polyethylene/foil/primer/polyethylene. When amine-containing products were packaged, blisters formed under the PET or between the polyethylene and foil. Pouches that were stressed or abused by twisting or dropping, e.g., normal handling stresses, developed significantly more blisters than did unstressed control pouches. Stressed areas along the inside edge of pouch heat seals also showed small blisters in many structures.

Stress cracking was dramatically shown by sealing a Saran (TM, Dow, vinylidene chloride vinyl choride copolymer) coated film over the test pouches. Saran turns brown in color when contacted by an amine. When product penetrates some area of the test material and contacts the Saran layer, a brown pattern develops thus identifying the leak area.

It would therefore be desirable to have a film structure and packages therefrom which is suitable for containing organics such as organic liquids or organic solvents or products containing such organics, e.g., products containing amines, diamines, triamines, xylenes, toluene, ethoxyethanols, urethane monomers, or epoxy monomers, or the like, which do not suffer from the problems of conventional films and packages therefrom. It is an object of this invention to provide such packaging which does not suffer from the problems of conventional films and packages therefrom. It is also an object of this invention to provide a combination of materials which accomplishes the desired result of providing a unique structure having superior properties for holding such organics.

It is also an object of this invention to provide a packaging film structure and package such as a pouch therefrom comprising: a first layer element comprised of a flexible barrier material and a sealant film, and a second layer element comprised of a high barrier material, wherein the second layer element is positioned outwardly of the first layer element and the sealant is positioned inwardly of the flexible barrier, i.e.: (outside) second layer element/flexible barrier/sealant (inside). This structure has superior properties which makes it suitable for packaging for organics such as organic liquids or solvents or products containing such liquids or solvents, e.g., adhesives or coating formulations.

SUMMARY OF THE INVENTION

It has now been surprisingly discovered that a packaging film structure and package therefrom comprising: a first layer element comprised of a flexible barrier material and a sealant film, and a second layer element comprised of a high barrier material, wherein the second layer element is positioned outwardly of the first layer element and the sealant is positioned inwardly of the flexible barrier, i.e.: (outside) second layer element/flexible barrier/sealant (inside), has superior properties which makes it suitable for packaging for organics such as organic liquids or solvents or products containing such liquids or solvents, e.g., adhesives or coating formulations. Thus, the present invention provides such a film structure and packages therefrom. The present invention also provides methods for packaging organics and methods of making films and packages therefrom.

Other objects and embodiments of the present invention are disclosed and will be obvious from the following detailed description.

DETAILED DESCRIPTION

The present invention provides a film structure and packaging therefrom comprising a first layer element and a second layer element. The first layer element comprises a flexible barrier material and a sealant. The second layer element comprises a high barrier material. The second layer element is positioned outwardly of said first layer element and the sealant is positioned inwardly of the flexible barrier, i.e.: (outside) second layer element/flexible barrier/sealant (inside).

The first and second layer elements can have additional layers. For instance, the second layer element can have an adhesive disposed interiorly of the high barrier material, e.g.: (outside) high barrier/adhesive/flexible barrier/sealant (inside).

The high barrier material can have additional outwardly disposed layer, layers or films for protection from heat, abrasion, solvents, etc., e.g.: (outside) protective material/high barrier/adhesive/flexible barrier/sealant (inside). Between the protective material and the high barrier material can also be disposed an adhesive, e.g.: (outside) protective material/adhesive/high barrier/adhesive/flexible barrier/sealant (inside). The adhesive layers can consist of a plurality of layers, e.g., a primer and then a coating of an adhesive or tie material. Suitable materials for adhesive or tie layers are known to the skilled artisan and and can include, by way of example (in addition to those discussed below with respect to the first layer element), ionomer resin (e.g., Surlyn, Tm DuPont) or an olefin or olefin-based material such as ethylene acrylic acid (EAA), ethylene vinyl acetate (EVA), olefin EVA-materials (e.g., EXXON 5610 which is a blend of polypropylene (PP) containing EVA) low density polyethylene (LDPE), linear low density polyethylene (LLDPE), medium density polyethylene (MDPE), blends of LDPE and LLDPE (e.g., 0 to 50% LDPE in LLDPE or LLDPE in LDPE, or typically 10 to 30% LDPE in LLDPE or typically 10 to 30% LLDPE in LDPE), or anhydride modified polyolefins (wherein "polyolefins" includes EVA, e.g., Admer (Mitsui, No. AT469C), Bynel (DuPont, E361or 3060), or Plexar 3343). Examples of film structures of this invention, suitable for a making into a package such as a pouch, wherein the adhesive layers can consist of plurality of layers comprises: (outside) protective layer/primer/Surlyn/high barrier/primer/LDPE/flexible barrier/sealant (inside), or, (outside) protective layer/primer/LDPE/high barrier material/primer/LDPE/flexible barrier/sealant (inside). Ethylene acrylic acid (EAA) is a suitable material for the primer to the high barrier when it is foil.

The high barrier material is preferably a metal foil such as aluminum foil or a nylon coated on one or both sides with a polyvinylidene chloride copolymer (e.g., "Saran" (Tm Dow) or, vinylidene chloride vinyl chloride copolymers, or "MA Saran" (Tm Dow, Dow Saran MA 119), or vinylidene chloride methyl acrylate copolymers).

As to nylon, nylon 6; 11; 12; 6, 12 and 6, 66 are suitable as are commercially available products such as ULTRAMIDKR 4600 (BASF), NOVAMID 2030 (Mitsubishi Chem. Co.), DURATHANE (Farbenfabriken Bayer, A.G.), "1030" (Unitika, Japan), ZYTEL SUPERTUFF 811 (DuPont), "4018" (Huels, Germany), and ELY 1256 (Elnser, Switzerland). Nylon coated with Saran is presently preferred in packages for soaps.

The protective layer material can be any suitable material, preferably polyethylene terephthalate (PET), copolymers of PET or CoPET, polybutylene terephthalate (PBT) or copolymers of PBT or CoPBT, or mixtures of PET and PBT, or copolymers of PET and PBT, polypropylene (PP), oriented polypropylene (OPP), and nylon. A commercially available film of PET is Mylar.

The flexible barrier material is preferably nylon. The sealant can consist of an halogen free olefin or olefin-based materials, more prefereably, the sealant can consist of halogen free olefin or olefin-based materials e.g., EVA, EVA-olefin materials (e.g., PP-EVA blends), LDPE, LLDPE, MDPE, blends of LDPE and LLDPE (e.g., 0 to 50% LDPE in LLDPE or LLDPE in LDPE, or typically 10 to 30% LDPE in LLDPE or typically 10 to 30% LLDPE in LDPE), or anhydide modified polyolefins. EVA, LDPE, LLDPE and blends of LDPE and LLDPE are presently preferred materials for the sealant. A tie can be between the flexible barrier material and the sealant. The first layer element can also further comprise a sealant polymer layer positioned outwardly of the flexible barrier material; and, a tie can also be between this outwardly positioned sealant layer and the flexible barrier material. Accordingly, the first layer element can comprise: EVA/tie/nylon/tie/EVA; or, more generally, sealant/tie/nylon/tie/sealant. This structure can be formed as a coextrusion which is then adhered to the second layer element. Suitable materials for such tie layers or adhesives are known to the ordinary skilled artisan and may include (in addition to the exemplified adhesives discussed above with respect to the second layer element), by way of example, anhydride modified polyolefins, (e.g., graft copolymer of maleic anhydride and propylene wherein maleic anhydride moities are grafted onto polypropylene chains) ethylene acrylic acid copolymers, ethylene methyl acrylate copolymers, blends or copolymers of PP and EVA, or other synthetic resinous materials. The selected tie or adhesive should be stable under the conditions by which the muultilayer structures and packages therefrom of this invention are prepared or used. For additional information on ties or adhesives, reference is made to commonly owned and copending U.S. patent application Ser. No. 07/458,489, filed Dec. 28, 1989, incorporated herein by reference. U.S. application Ser. No. 07/458,489, relates to sealant blends, e.g., of:

polyethylene-based polymers, ethylene-methyl acrylate copolymers and polybutylene, for peelable sealant blends; polyethylene-based polymers and polybutylene for peelable sealant blends when very low temperature sealing is not required; ethylene-methyl acrylate copolymer and polybutylene, for peelable sealant blends when having excellent hot tack is unimportant; and polyethylene-based polymers and methyl acrylate for non-peelable sealant blends which seal with good hot tack. Surlyn is an ionomer blend which can also be employed as a sealant layer of the present invention. Sealant blends of U.S. application Ser. No. 07/458,489 can also be useful as sealant layers in the present invention. A high VA EVA may not perform as well as other EVAs in this invention.

In the structures of the present invention it has been found that the flexible barrier material provides a primary barrier for the organic product; the innermost sealant material provides an integral sealant layer and seal for the package; and, the high barrier material provides an effective barrier between the outside atmosphere and the organic product within the package. In particular, nylon as the flexible barrier material, slows down the migration of amines which was observed with respect to conventional packages and discussed under the heading "BACKGROUND OF THE INVENTION"; and, aluminum foil or Saran coated nylon for the high barrier material provides a good barrier which prevents water or moisture from contacting the organic product (note for instance that amines have a high affinity to water). Nylon acts as a good barrier for containing organic products such as solvents, e.g., amines, within the package; and, the use of nylon as the flexible barrier endows packages of this invention with a shelf life of one year or longer.

In view of the foregoing, the following are multilayer structures within the scope of this invention: (outside) foil/adhesive/nylon/sealant (inside); (outside) nylon coated with polyvinylidene chloride copolymer (MA or VC)/adhesive/nylon/sealant (inside); (outside) protective layer/foil/adhesive/nylon/sealant (inside); (outside) protective layer/nylon coated with polyvinylidene chloride copolymer (MA or VC)/adhesive/nylon/sealant (inside); (outside) PET/primer/Surlyn/Aluminum Foil/primer/LDPE/EVA/tie/nylon/tie/EVA (inside); (outside) OPP/primer/LDPE/Aluminiuim Foil/Primer/LDPE/EVA/tie/nylon/tie/EVA (inside).

Throughout this specification reference has been or will be made to film structures with the terms "(outside)" and "(inside)". These terms denote the position of layers relative to a package made from the film structure. For example, as to the film structure (outside) foil/adhesive/nylon/sealant (inside), a package therefrom, e.g., from face-to-face films of that structure, would have the foil layer outside or exteriorly disposed and the sealant layer inside or interiorly disposed (the sealant layers sealed to each other to form a pouch).

If films or layers in this invention are oriented, e.g., oriented polypropylene (OPP), they may be so oriented by conventional processes, such as blown tubular orientation, stretch orientation, or molecular orientation. In polyvinylidene chloride-based copolymers, the methyl acrylate ("MA") or vinyl chloride ("VC") comonomer is preferably present in an amount of about 3 to 8% by weight, preferably from 6 to 8% by weight, based upon total weight, and can be even higher in some instances, e.g. 12% or even up to 15%.

Films or sheets of the first and second layer elements of this invention are formed into a finished package or "film package" such as a pouch by any conventional technique. For instance, by forming heat or adhesive seals about the periphery of the shape to be formed into a pouch. For example, if a square pouch is desired, a rectangular film twice the desired length of the pouch is folded, the two parallel sides of the periphery (perpendicular to the fold) heat or adhesive sealed, or, the two parallel sides and the fold are heat or adhesive sealed, the organic other material to be packaged inserted therein, and then the remaining open side of the periphery is heat or adhesive sealed. Another method for making a pouch is by sealing on three sides face-to-face films, filling the thus formed open pouch with the organic or whatever material is to be packaged therein, and then sealing the fourth side. For background on pouches or bags and their production, reference is made to U.S. Pat. Nos. 4,190,477, 4,311,742, 4,360,550, 4,424,256 and 4,557,377, each of which being hereby incorporated herein by reference; and, reference is made to commonly owned and copending U.S. application Ser. No. 07/550,738, filed Jul. 9, 1990 and also incorporated herein by reference. U.S. application Ser. No. 07/550,738 relates to laser scoring of packaging substrates to provide an easy tear open feature and discloses expandable pouches, which are useful in the practice of this invention. It is preferred that a sealant layer of the first layer element be disposed interiorly when forming a package or pouch of this invention and that said sealant layer be employed to seal the package together, e.g., by heat seals.

While the present invention is particularly suited to containing organics it is to be noted that the contents of a package of this invention is not to be considered a limitation of this invention. It should be understood that this invention is applicable to any process for forming films, film structures or laminates (which can then be formed into a package, preferably a pouch, or a structure to be folded and sealed), including laminations, extrusions, coextrusion, blown extrusion, tubular water quench extrusion, extrusion coating, and the like, and combinations thereof. Likewise, the present invention is applicable to any process and apparatus for forming a package, preferably a pouch, including, a horizontal pouch forming machine and a vertical form, fill and seal machine.

Throughout this specification, reference has been or will be made to layers, layer elements, multilayer structures, films, film structures or laminates. These multilayer or film structures, layers or layer elements, or films or laminates are the same thickness as conventional multilayer structures, films, film structures, layers, layer elements, or laminates. Typical thickness can range from about 2.0 mils (0.051 mm) to 5 mils or more, e.g., 13 mils or even 20 mils, with a normal range of about 0.5 to about 5.0 mils, preferably about 1.5 to about 3.0 mils (0.038–0.076 mm). Films thinner than about 1.5 mils (0.038 mm) may be too weak to perform their required function (although individual layers of multilayer structures or layer elements may be thinner than about 1.5 mils, e.g., about 0.25 to about 1 mil and polymer tie layers can be as thin as about 0.15 mil). Laminates can be up to 10 mils thick and multilayer structures can include films (even single layer films), film structures and laminates and can be up to 100 mils thick. "Structure" includes multilayer structure, layer element and the combination of the first and second layer elements as used herein. A container from a multilayer structure can have an average thickness of about 30 mils.

It is important that layers of the first layer element, the layers of the second layer element and the first and second layer elements themselves be well bonded.

The following non-limiting examples are given by way of illustration only and are not to be considered limitations of this invention, many apparent variations of which are possible without departing from the spirit or scope thereof.

EXAMPLE 1
Testing of a Preferred First Layer Element Alone

A blown coextrusion film of the type EVA/tie/nylon/tie/EVA was made into pouches and filled with Stonhard product 128 type hardener. In storage conditions of 90% relative humidity (R.H.) and 100° F., many blisters or pockets of amine and water were formed between the tie and nylon interface nearest the product. At 50% R.H. and 73° F., smaller blisters were seen to form in the same time frame. At 20% R.H. and 100° F., no blisters were observed. Without wishing to be bound by any particular theory, one explanation is that water vapor can travel through the outside layers of EVA/tie/nylon and combine with the amine that traveled through the inner EVA/tie layers. This demonstrates that nylon acts as a barrier to the amine but not to the water vapor. At 20% R.H. and 100° F., a slight sign of product permeation was noted on the outside of the pouch after several weeks. This indicates that the nylon layer in the coextrusion used for these pouches was a good barrier for the product formulation in test.

EXAMPLE 2
A Preferred Combination of First and Second Layer Elements

A 2.5 mil blown coextrusion of the type employed in Example 1 was adhered to a second layer element having 48 ga. PET as a protective outer layer and 35 ga. A1 foil as the high barrier layer. The combination had the following structure:

(outside)

48 ga. PET

Primer—Urethane Adcote 527 Base 12 lbs./ream Surlyn 1652

35 ga. Aluminum Foil

Primer—Formula 6504

12 lbs./ream LDPE 2.5 mil Coex Film—EVA/tie/nylon/tie/EVA (inside)

The combination was made into pouches, filled with Stonhard Product 128 type hardner, and subjected to the various storage conditions set forth in Example 1. No blisters, bubbles or pockets were observed; the A1 foil layer provided a high barrier to the outside atmosphere, e.g., moisture; the PET provided good protection from outside elements, normal stresses or abuse; and no stress cracking or product permeation was observed.

EXAMPLE 3
Another Preferred Combination of First and Second Layer Elements

A 2.5 mil blown coextrusion of the type employed in Example 1 was adhered to a second layer element having 75 ga. OPP as a protective outer layer and 35 ga. A1 foil as the high barrier layer. The combination had the following structure:

(outside)

75 ga. OPP

PEI Primer 12 lbs./ream LDPE 35 ga. Aluminum Foil

Primer—Formula 6504

12 lbs./ream LDPE 2.5 mil Coex Film—EVA/tie/nylon/tie/EVA (inside)

The combination was made into pouches, filled with Stonhard Product 128 type hardner, and subjected to the various storage conditions set forth in Example 1. No blisters, bubbles or pockets were observed; the A1 foil layer provided a high barrier to the outside atmosphere e.g., moisture; the OPP provided good protection from outside elements, normal streeses or abuse; and no stress cracking or product permeation was observed.

Having thus described in detail preferred embodiments of the present invention, it is to be understood that the invention defined by the appended claims is not to be limited to partcular details set forth in the above description as many apparent variations thereof are possible without departing from the spirit or scope of the present invention.

What is claimed is:

1. A flexible package adapted for packaging an organic liquid or organic solvent, said package having an interior and an exterior, said package further having at least a pair of sidewalls in a face to face relation, said sidewalls comprising a coextruded first layer element and a second layer element, said first layer element comprising a flexible barrier material layer consisting essentially of a nylon and a separate sealant layer, said second layer element having a high barrier layer selected from the group consisting of a metal foil, a nylon and a vinylidene chloride copolymer wherein, said flexible barrier material layer is disposed between said sealant layer and said second layer element and the sealant layer of said sidewalls being in contact with said material comprising an organic liquid or organic solvent, said sealant layer being selected from the group consisting of halogen free olefin and olefin-based materials, said package being sealed by said sealant layers of said sidewalls being adhered together about the edges of said sidewalls such that said second layer element or flexible barrier layer are not in contact with said material comprising an organic liquid or organic solvent, wherein said layer elements have a thickness of at least 1.5 mils (0.038 mm).

2. The flexible package of claim 1 wherein said second layer element further consists essentially of a first adhesive layer disposed between said high barrier material layer and said flexible barrier material layer.

3. The flexible package of claim 2 wherein the high barrier material layer consists essentially of aluminum foil or nylon coated on at least one side with a polyvinylidene chloride copolymer, and the flexible barrier material layer comprises nylon.

4. The flexible package of claim 2 wherein said second layer element further consists essentially of a protective layer disposed over said high barrier material layer on the side opposite said first layer element.

5. The flexible package of claim 4 wherein said second layer element further consists essentially of a second adhesive layer disposed between said protective layer and said high barrier material layer.

6. The flexible package of claim 5 wherein said second layer element further consists essentially of a first primer layer disposed between said high barrier material layer and said first adhesive layer.

7. The flexible package of claim 6 wherein said second layer element further consists essentially of a second primer layer disposed between said protective layer and said second adhesive layer.

8. The flexible package of claim 7 wherein said protective layer consists essentially of polyethylene terephthalate, polybutylene terephthalate, copolymers of polyethylene terephthalate, copolymers of polybutylene terephthalate, mixtures of polyethylene terephthalate and polybutylene terephthalate, oriented polypropylene, or nylon; said high barrier material layer consists essentially of aluminum foil or nylon coated on at least one side with a polyvinylidene chloride copolymer; said first adhesive layer consists essentially of ethylene acrylic acid, an ionomer resin, low density polyethylene, ethylene vinyl acetate, linear low density polyethylene, anhydride modified polyolefin, ethylene vinyl acetate-olefin material, or blends of low density polyethylene and linear low density polyethylene; the second adhesive layer consists essentially of ethylene acrylic acid, an ionomer resin, low density polyethylene, ethylene vinyl acetate, linear low density polyethylene, anhydride modified polyolefin, ethylene vinyl acetate-olefin material, or blends of low density polyethylene and linear low density polyethylene; and, the flexible barrier material consists essentially of nylon.

9. The flexible package of claim 8 wherein the first adhesive layer consists essentially of ethylene acrylic acid, low density polyethylene or an ionomer resin; and, the second adhesive layer comprises ethylene acrylic acid, low density polyethylene or an ionomer resin.

10. The flexible package of claim 7 wherein the first layer element further consists essentially of a sealant polymer layer disposed between the flexible barrier material layer and the first adhesive layer.

11. The flexible package of claim 10 wherein said first layer element further consists essentially of a first tie layer positioned between the flexible barrier material layer and the sealant layer, and a second tie layer positioned between the flexible barrier material layer and the sealant polymer layer.

12. The flexible package of claim 11 wherein said protective layer consists essentially of polyethylene terephthalate, polybutylene terephthalate, copolymers of polyethylene terephthalate, copolymers of polybutylene terephthalate, mixtures of polyethylene terephthalate and polybutylene terephthalate, oriented polypropylene, or nylon; said high barrier material layer consists essentially of aluminum foil or nylon coated on at least one side with a polyvinylidene chloride copolymer; said first adhesive consists essentially of ethylene acrylic acid, an ionomer resin, low density polyethylene, ethylene vinyl acetate, linear low density polyethylene, anhydride modified polyolefin, ethylene vinyl acetate-olefin material, or blends of low density polyethylene and linear low density polyethylene; the second adhesive consists essentially of ethylene acrylic acid, an ionomer resin, low density polyethylene, ethylene vinyl acetate, linear low density polyethylene, anhydride modified polyolefin, ethylene vinyl acetate-olefin material, or blends of low density polyethylene and linear low density polyethylene; the flexible barrier material consists essentially of nylon; said sealant layer comprises ethylene vinyl acetate, ethylene vinyl acetate-olefin material, low density polyethylene, linear low density polyethylene, medium density polyethylene, or blends of low density polyethylene and linear low density polyethylene.

13. The flexible package of claim 12 wherein the first adhesive layer consists essentially of ethylene acrylic acid, low density polyethylene or an ionomer resin; the second adhesive layer consists essentially of ethylene acrylic acid, low density polyethylene or an ionomer resin; and the sealant layer consists essentially of ethylene vinyl acetate, low density polyethylene.

14. The flexible package of claim 13 wherein the high barrier material comprises aluminum foil; the protective layer consists essentially of polyethylene terephthalate or oriented polypropylene; the first adhesive layer consists essentially of ethylene acrylic acid, low density polyethylene or an ionomer resin; the second adhesive layer consists essentially of ethylene acrylic acid, low density polyethylene or an ionomer resin; and the sealant layer consists essentially of ethylene vinyl acetate.

15. A method for packaging a material comprising an organic liquid or organic solvent said method comprising the step of providing a package, said package having an interior and an exterior, said package further having at least a pair of sidewalls in a face to face relation said sidewalls comprising a coextruded first layer element and a second layer element, said first layer element comprising a flexible barrier material layer consisting essentially of a nylon and a separate sealant layer, said second layer element having a high barrier layer selected from the group consisting of a metal foil, a nylon and a vinylidene chloride copolymer wherein said flexible barrier material layer is disposed between said sealant layer and said second layer element, and the sealant layer of said sidewalls being adapted to be in contact with a material comprising an organic liquid or organic solvent, said sealant layer being selected from the group consisting of halogen free olefin and olefin-based materials, said package being sealed by said sealant layers of said sidewalls being adhered together about the edges of said sidewalls such that said second layer element or flexible barrier layer are not in contact with said material comprising an organic liquid or organic solvent, wherein said layer elements have a thickness of at least 1.5 mils (0.038 mm);

placing said material comprising an organic liquid or organic solvent in said package.

16. A flexible package adapted for packaging a material comprising an organic liquid or organic solvent, said package having an interior and an exterior, said package further having at least a pair of sidewalls in a face to face relation, said sidewalls comprising a coextruded first layer element and a second layer element, said first layer element comprising a flexible barrier material layer consisting essentially of a nylon and a separate sealant layer, said second layer element having a high barrier layer selected from the group consisting of a metal foil, a nylon and a vinylidene chloride copolymer wherein, said flexible barrier material layer is disposed between said sealant layer and said second layer element and the sealant layer of said sidewalls being in contact with said material comprising an organic liquid or organic solvent, said sealant layer being selected from the group consisting of halogen free olefin and olefin-based materials, said package being sealed by said sealant layers of said sidewalls being adhered together about the edges of said sidewalls such that said second layer element or flexible barrier layer are not in contact with said material comprising an organic liquid or organic solvent, wherein said layer elements have a thickness of at least 1.5 mils (0.038 mm) and wherein the organic liquid or organic solvent is selected from the group consisting of amines, diamines, triamines, xylenes, toluene, ethoxyethanols, urethanes and epoxies.

17. A method for packaging a material comprising an organic liquid or organic solvent said method comprising the step of providing a package, said package having an interior and an exterior, said package further having at least a pair of sidewalls in a face to face relation said sidewalls comprising a coextruded first layer element and a second layer element, said first layer element comprising a flexible barrier material layer consisting essentially of a nylon and a separate sealant layer, said second layer element having a high barrier layer selected from the group consisting of a metal foil, a nylon and a vinylidene chloride copolymer wherein said flexible barrier material layer is disposed between said sealant layer and said second layer element, and the sealant layer of said sidewalls being in contact with said material comprising an organic liquid or organic solvent, said sealant layer being selected from the group consisting of halogen free olefin and olefin-based materials, said package being sealed by said sealant layers of said sidewalls being adhered together about the edges of said sidewalls such that said second layer element or flexible barrier layer are not in contact with said material comprising an organic liquid or organic solvent, wherein said layer elements have a thickness of at least 1.5 mils (0.038 mm) and wherein the organic liquid or organic solvent is selected from the group consisting of amines, diamines, triamines, xylenes, toluene, ethoxyethanols, urethanes and epoxies.

18. A flexible package adapted for packaging a material comprising an organic liquid or organic solvent, said package having an interior and an exterior, said package further having at least a pair of sidewalls in a face to face relation said sidewalls comprising a coextruded first layer element and a second layer element, said first layer element consisting essentially of a flexible barrier material layer consisting essentially of a nylon and a separate sealant layer, said second layer element having a high barrier layer selected from the group consisting of a metal foil, a nylon and a vinylidene chloride copolymer wherein, said flexible barrier material layer is disposed between said sealant layer and said second layer element, and the sealant layer of said sidewalls being in contact with said material comprising an organic liquid or organic solvent, said sealant layer being selected from the group consisting of halogen free olefin and olefin-based materials, ethylene vinyl acetate, ethylene vinyl acetate-olefin materials, low density polyethylene, linear low density polyethylene and medium density polyethylene, said package being sealed by said sealant layers of said sidewalls being adhered together about the edges of said sidewalls such that said second layer element or flexible barrier layer are not in contact with said material comprising an organic liquid or organic solvent, wherein said layer elements have a thickness of at least 1.5 mils (0.038 mm).

19. A method for packaging a material comprising an organic liquid or organic solvent said method comprising the step of providing a package, said package having an interior and an exterior, said package further having at least a pair of sidewalls in a face to face relation said sidewalls comprising a coextruded first layer element and a second layer element, said first layer element consisting essentially of a flexible barrier material layer consisting essentially of a nylon and a separate sealant layer, said second layer element having a high barrier layer selected from the group consisting of a metal foil, a nylon and a vinylidene chloride copolymer wherein said flexible barrier material layer is disposed between said sealant layer and said second layer element, and the sealant layer of said sidewalls being adapted to be in contact with a material comprising an organic liquid or organic solvent, said sealant layer being selected from the group consisting of halogen free olefin and olefin-based materials, ethylene vinyl acetate, ethylene vinyl acetate-olefin materials, low density polyethylene, linear low density polyethylene and medium density polyethylene, said package being sealed by said sealant layers of said sidewalls being adhered together about the edges of said sidewalls such that said second layer element or flexible barrier layer are not in contact with said material comprising an organic liquid or organic solvent, wherein said layer elements have a thickness of at least 1.5 mils (0.038 mm);

placing said material comprising an organic liquid or organic solvent in said package.

20. A flexible package adapted for packaging a material comprising an organic liquid or organic solvent, said package having an interior and an exterior, said package further having at least a pair or sidewalls in a face to face relation said sidewalls comprising a coextruded first layer element and a second layer element, said first layer element consisting essentially of a flexible barrier material layer consisting essentially of a nylon and a separate sealant layer, said second layer element having a high barrier layer selected from the group consisting of a metal foil, a nylon and a vinylidene chloride copolymer wherein, said flexible barrier material layer is disposed between said sealant layer and said second layer element, and the sealant layer of said sidewalls being in contact with said material comprising an organic liquid or organic solvent, said sealant layer being selected from the group consisting of halogen free olefin and olefin-based materials, ethylene vinyl acetate, ethylene vinyl acetate-olefin materials, low density polyethylene, linear low density polyethylene and medium density polyethylene, said package being sealed by said sealant layers of said sidewalls being adhered together about the edges of said sidewalls such that said second layer element or flexible barrier layer are not in contact with said material comprising an organic liquid or organic solvent, wherein said layer elements have a thickness of at least 1.5 mils (0.038 mm) and wherein the organic liquid or organic solvent is selected from the group consisting of amines, diamines, triamines, xylenes, toluene, ethoxyethanols, urethanes and epoxies.

21. A method for packaging a material comprising an organic liquid or organic solvent said method comprising the step of providing a package, said package having an interior and an exterior, said package further having at least a pair of sidewalls in a face to face relation said sidewalls comprising a coextruded first layer element and a second layer element, said first layer element consisting essentially of a flexible barrier material layer consisting essentially of a nylon and a separate sealant layer, said second layer element having a high barrier layer selected from the group consisting of a metal foil, a nylon and a vinylidene chloride copolymer wherein said flexible barrier material layer is disposed between said sealant layer and said second layer element, and the sealant layer of said sidewalls being in contact with said material comprising an organic liquid or organic solvent, said sealant layer being selected from the group consisting of halogen free olefin and olefin-based materials, ethylene vinyl acetate, ethylene vinyl acetate-olefin materials, low density polyethylene, linear low density polyethylene and medium density polyethylene, said package being sealed by said sealant layers of said sidewalls being adhered together about the edges of said sidewalls such that said second layer element or flexible barrier layer are not in contact with said material comprising an organic liquid or organic solvent, wherein said layer elements have a thickness of at least 1.5 mils (0.038 mm) and wherein the organic liquid or organic solvent is selected from the group consisting of amines, diamines, triamines, xylenes, toluene, ethoxyethanols, urethanes and epoxies.

22. A flexible package adapted for packaging a material comprising an organic liquid or organic solvent, said package having an interior and an exterior, said package further having at least a pair of sidewalls in a face to face relation said sidewalls comprising a coextruded first layer element and a second layer element, said first layer element consisting essentially of a flexible barrier material layer consisting essentially of a nylon and a separate sealant layer, said second layer element having a high barrier layer selected from the group consisting of a metal foil, a nylon and a vinylidene chloride copolymer wherein, said flexible barrier material layer is disposed between said sealant layer and said second layer element, and the sealant layer of said sidewalls being in contact with said material comprising an organic liquid or organic solvent, said sealant layer being selected from the group consisting of halogen free olefin and olefin-based materials, ethylene vinyl acetate, ethylene vinyl acetate-olefin materials, low density polyethylene, linear low density polyethylene and medium density polyethylene, said package being sealed by said sealant layers of said sidewalls being adhered together about the edges of said sidewalls such that said second layer element or flexible barrier layer are not in contact with said material comprising an organic liquid or organic solvent, said second layer element further comprises a protective layer disposed over said layer on the side opposite said coextruded first layer elements, said protective layer comprises polyethylene terephthalate, polybutylene terephthalate, copolymers of polyethylene terephthalate, copolymers of polybutylene terephthalate, mixtures of polyethylene terephthalate and polybutylene terephthalate or oriented polypropylene, wherein said layer elements have a thickness of at least 1.5 mils (0.038 mm).

23. A method for packaging a material comprising an organic liquid or organic solvent said method comprising the step of providing a package, said package having an interior and an exterior, said package further having at least a pair of sidewalls in a face to face relation, said sidewalls comprising a coextruded first layer element and a second layer element, said first layer element comprising a flexible barrier material layer consisting essentially of a nylon and a separate sealant layer, said second layer element having a high barrier layer selected from the group consisting of a nylon and a vinylidene chloride copolymer wherein said flexible barrier material layer is disposed between said sealant layer and said second layer element, and the sealant layer of said sidewalls being adapted to be in contact with a material comprising an organic with an organic liquid or organic solvent, said sealant layer being selected from the group consisting of halogen free olefin and olefin based materials, ethylene vinyl acetate, ethylene vinyl acetate-olefin materials, low density polyethylene, linear low density polyethylene and medium density polyethylene, said package being sealed by said sealant layers of said sidewalls being adhered together about the edges of said sidewalls such that said high barrier or flexible barrier layers are not in contact with said material comprising an organic liquid or organic solvent, said second layer element further comprises a protective layer disposed over said high barrier material layer on the side opposite said coextruded first layer elements, said protective layer comprises polyethylene terephthalate, polybutylene terephthalate, copolymers of polyethylene terephthalate, copolymers of polybutylene terephthalate, mixtures of polyethylene terephthalate and polybutylene terephthalate or oriented polypropylene wherein said layer elements have a thickness of at least 1.5 mils (0.038 mm);

placing said material comprising an organic liquid or organic solvent in said package.

24. A flexible package adapted for packaging a material comprising an organic liquid or organic solvent, said package having an interior and an exterior, said package further having at least a pair of sidewalls in a face to face relation, said sidewalls comprising a coextruded first layer element and a second layer element, said first layer element comprising a separate sealant layer, a tie, a flexible barrier material layer consisting essentially of a nylon, a second tie and a second separate sealant layer, said second layer element having a high barrier layer selected from the group consisting of a nylon and a vinylidene chloride copolymer wherein, said flexible barrier material layer is disposed between said sealant layer and said second layer element, and the sealant layer of said sidewalls being in contact with said material comprising an organic liquid or organic solvent, said sealant layer being selected from the group consisting of halogen free olefin and olefin-based materials, ethylene vinyl acetate, ethylene vinyl acetate-olefin materials, low density polyethylene, linear low density polyethylene and medium density polyethylene, said package being sealed by said sealant layers of said sidewalls being adhered together about the edges of said sidewalls such that said second layer element or flexible barrier layer are not in contact with said material comprising an organic liquid or organic solvent, said second layer element further comprises a protective layer disposed over said layer on the side opposite said coextruded first layer elements, said protective layer comprises polyethylene terephthalate, polybutylene terephthalate, copolymers of polyethylene terephthalate, copolymers of polybutylene terephthalate, mixtures of polyethylene terephthalate and polybutylene terephthalate or oriented polypropylene, wherein said layer elements have a thickness of at least 1.5 mils (0.038 mm).

25. A method for packaging a material comprising an organic liquid or organic solvent said method comprising the step of providing a package, said package having an interior and an exterior, said package further having at least a pair of sidewalls in a face to face relation, said sidewalls comprising a coextruded first layer element and a second layer element, said first layer element comprising a separate sealant layer, a tie, a flexible barrier material layer consisting essentially of a nylon, a second tie and a second separate sealant layer, said second layer element having a high barrier layer selected from the group consisting of a nylon and a vinylidene chloride copolymer wherein said flexible barrier material layer is disposed between said sealant layer and said second layer element, and the sealant layer of said sidewalls being adapted to be in contact with a material comprising an organic liquid or organic solvent, said sealant layer being selected from the group consisting of halogen free olefin and olefin based materials, ethylene vinyl acetate, ethylene vinyl acetate-olefin materials, low density polyethylene, linear low density polyethylene and medium density polyethylene, said package being sealed by said sealant layers of said sidewalls being adhered together about the edges of said sidewalls such that said high barrier or flexible barrier layers are not in contact with said material comprising an organic liquid or organic solvent, said second layer element further comprises a protective layer disposed over said high barrier material layer on the side opposite said coextruded first layer elements, said protective layer comprises polyethylene terephthalate, polybutylene terephthalate, copolymers of polyethylene terephthalate, copolymers of polybutylene terephthalate, mixtures of polyethylene terephthalate and polybutylene terephthalate or oriented polypropylene wherein said layer elements have a thickness of at least 1.5 mils (0.038 mm);

placing said material comprising an organic liquid or organic solvent in said package.

* * * * *